(12) United States Patent
Sahu et al.

(10) Patent No.: US 9,098,637 B1
(45) Date of Patent: Aug. 4, 2015

(54) RANKING PROCESS FOR SIMULATION-BASED FUNCTIONAL VERIFICATION

(75) Inventors: Bijaya Kumar Sahu, Ghaziabad (IN); Frank Armbruster, Erfurt (DE); Hannes Froehlich, Brighton (GB); Sandeep Pagey, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 248 days.

(21) Appl. No.: 13/278,930

(22) Filed: Oct. 21, 2011

(51) Int. Cl.
G06F 17/50 (2006.01)
G06F 11/36 (2006.01)

(52) U.S. Cl.
CPC ........ *G06F 11/3692* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 7,320,090 B2* | 1/2008 | Coulter et al. | 714/30 |
| 7,886,242 B1* | 2/2011 | Chakraborti et al. | 716/106 |
| 7,890,902 B1 | 2/2011 | Sahu et al. | |
| 8,156,457 B2* | 4/2012 | Basile et al. | 716/106 |
| 8,214,782 B1* | 7/2012 | Chakraborti et al. | 716/106 |
| 8,560,985 B1* | 10/2013 | Sahu et al. | 716/106 |
| 8,719,789 B2* | 5/2014 | Adler et al. | 717/124 |
| 2005/0278576 A1* | 12/2005 | Hekmatpour | 714/37 |
| 2010/0070940 A1* | 3/2010 | Bist et al. | 716/5 |
| 2012/0221283 A1* | 8/2012 | Lee | 702/119 |

OTHER PUBLICATIONS

Young-Su Kwon; Young-Il Kim; Chong-Min Kyung, "Systematic functional coverage metric synthesis from hierarchical temporal event relation graph," Design Automation Conference, 2004. Proceedings. 41st , vol., no., pp. 45, 48, Jul. 7-11, 2004 URL: http://ieeexplore.ieee.org/stamp/stamp.jsp?tp=&arnumber=1322435&isnumber=29281.*
L. Li, S. A. Szygenda, and M. A. Thornton. Combining simulation and formal verification for integrated circuit design validation. In Proceedings of the 9th World Multi-Conference on Systemics, Cybernetics and Informatics (WMSCI), pp. 92-97, 2005.*
Sharon Rosenberg, Combined coverage methodology speeds verification, EETimes, Mar. 13, 2003 as retrieved from http://www.eetimes.com/document.asp?doc_id=1201923 on May 19, 2014.*
Ichihara, H.; Kajihara, S.; Kinoshita, K., "On test generation with a limited number of tests," VLSI, 1999. Proceedings. Ninth Great Lakes Symposium on , vol., no., pp. 12, 15, Mar. 4-6, 1999.*

* cited by examiner

*Primary Examiner* — Omar Fernandez Rivas
*Assistant Examiner* — Robert Brock
(74) *Attorney, Agent, or Firm* — Holland & Knight LLP; Mark H. Whittenberger, Esq.

(57) ABSTRACT

The present disclosure relates to a method for verifying a digital design using a computing device. The method may include determining one or more tests associated with verifying the digital design and generating, using the computing device, a verification result by performing one or more verification runs on the digital design. The method may further include merging coverage data generated by the one or more verification runs and ranking the one or more tests based upon, at least in part, a first verification run having a first configuration and a second verification run having a second configuration, wherein the first and second configurations differ.

21 Claims, 9 Drawing Sheets

RANKING PROCESS FOR SIMULATION-BASED FUNCTIONAL VERIFICATION

FIELD OF THE INVENTION

The embodiments of the present disclosure relate to a method of functional verification, and more particularly, to a ranking process for simulation-based functional verification.

BACKGROUND

Integrated circuits (ICs) have become the backbone of modern consumer electronics. The increased demand for functionality of consumer electronics has forced the complexity of IC's to skyrocket. In a number of applications, ICs must be highly functional, low cost and have low power consumption. These demands create increased complexity on the design, verification, and manufacture of ICs.

A typical IC design may involve the creation of electronic components, such as transistors and resistors, and the interconnections of these components onto a substrate, such as silicon. The simulation, verification, and sometimes layout of these components usually is accomplished in sub-blocks, or modules. Each block may be simulated and verified individually. Multiple design teams typically work on the individual blocks. During the design process functional verification is critical.

Functional verification involves the verification that the design conforms to the specification. Functional verification may involve the validation that a design meets the desired functionality. Part of the process of verification includes the creation of Register Transfer Level (RTL) digital designs that describe in detail the functionality of the device or block at every cycle of the clock. Creation and verification of RTL designs may be one of the more difficult portions of the design process. In many instances, this verification is a very difficult and time intensive task. Simulation tools are typically used to assist in verification. In most designs, simulation-based functional verification is performed on multiple machines in parallel. During the verification process "coverage" data is produced that may indicate which portions of the functionality and/or code have been tested.

Until recently, using coverage in the verification cycle of digital designs was done using a very simple flow and was restricted mainly to using code coverage. In the simplest flow, a design under verification (DUV) is simulated using multiple testbenches and a coverage database is generated for the DUV for each simulation run. Once all the simulations have been run, the coverage databases obtained from each run are merged together to get a comprehensive view of the coverage obtained from the entire verification.

If the design under verification (DUV) is identical across all the simulation runs, the merge is straightforward since the design hierarchy and the set of coverage points are identical. In practical usage, this is not the case. Multiple design teams may work on individual blocks of a chip. In order to get a complete view, the coverage results from simulations of the individual blocks may need to be stitched together to get the chip-level view. Different configurations of a chip may be run in different simulations. As part of user methodology, different simulation runs of the same design may have different modules at different levels of abstraction. For example, one level of abstraction may contain modules written in a higher level language, such as systemC, while another may be written in a low level language such as a Hardware Description Language (HDL). As multiple teams work on various parts of a design and the design evolves over time, both the design hierarchy (affecting code coverage) and the functional coverage points (affecting functional coverage) may undergo changes.

If the verification goal is not met then additional tests may be created to cover the uncovered area of the design. When the verification goal is met, test ranking may be performed to determine the minimum set of tests, which may subsequently be used as the regression test-suite. In this manner, test ranking may be utilized to remove redundant tests from the test-suite.

SUMMARY OF INVENTION

Accordingly, an embodiment of the present disclosure is directed to a computer-implemented method for verifying a digital design using a computing device. The method may include determining one or more tests associated with verifying the digital design and generating, using the computing device, a verification result by performing one or more verification runs on the digital design. The method may further include merging coverage data generated by the one or more verification runs and ranking the one or more tests based upon, at least in part, a first verification run having a first configuration and a second verification run having a second configuration, wherein the first and second configurations differ.

One or more of the following features may be included. In some embodiments, ranking may include performing system-level and block-level tests concurrently. In some embodiments, ranking may be based upon, at least in part, a combination of a first merged model generated at a first time with a second merged model generated at a second time. In some embodiments, ranking may include receiving a set of runs having a specified run order to generate a target model and receiving a rank configuration. In some embodiments ranking may include receiving a target model from a previous merge and receiving a rank configuration. In some embodiments, ranking may include projecting one or more runs into the target model to generate a bit array of each run. In some embodiments, ranking may include extracting information corresponding to a previously merged run for use as an input run. The method may further include determining at least one redundant test run based upon, at least in part, the ranking. The method may also include determining an optimized run order based upon, at least in part, the ranking.

In another embodiment of the present disclosure a computer-readable storage medium having stored thereon instructions for verifying a digital design using a computing device, which when executed by a processor result in a number of operations is provided. Operations may include determining one or more tests associated with verifying the digital design and generating, using the computing device, a verification result by performing one or more verification runs on the digital design. Operations may also include merging coverage data generated by the one or more verification runs and ranking the one or more tests based upon, at least in part, a first verification run having a first configuration and a second verification run having a second configuration, wherein the first and second configurations differ.

One or more of the following features may be included. In some embodiments, ranking may include performing system-level and block-level tests concurrently. In some embodiments, ranking may be based upon, at least in part, a combination of a first merged model generated at a first time with a second merged model generated at a second time. In some embodiments, ranking may include receiving a set of runs having a specified run order to generate a target model and receiving a rank configuration. In some embodiments ranking may include receiving a target model from a previous merge and receiving a rank configuration. In some embodiments, ranking may include projecting one or more runs into the target model to generate a bit array of each run. In some embodiments, ranking may include extracting information corresponding to a previously merged run for use as an input run. Operations may further include determining at least one redundant test run based upon, at least in part, the ranking. Operations may also include determining an optimized run order based upon, at least in part, the ranking.

In yet another embodiment of the present disclosure a computing system for verifying a digital design using a computing device is provided. In some embodiments, the computing system may include at least one processor and at least one memory architecture coupled with the at least one processor. In some embodiments, the system may further include a first software module executed by the at least one processor, wherein the first software module is configured to determine one or more tests associated with verifying the digital design. The system may also include a second software module executed by the at least one processor, wherein the second software module is configured to generate, using the computing device, a verification result by performing one or more verification runs on the digital design. The system may further include a third software module executed by the at least one processor, wherein the third software module is configured to merge coverage data generated by the one or more verification runs. The system may additionally include a fourth software module executed by the at least one processor, wherein the fourth software module is configured to rank the one or more tests based upon, at least in part, a first verification run having a first configuration and a second verification run having a second configuration, wherein the first and second configurations differ.

One or more of the following features may be included. In some embodiments, ranking may include performing system-level and block-level tests concurrently. In some embodiments, ranking may be based upon, at least in part, a combination of a first merged model generated at a first time with a second merged model generated at a second time. In some embodiments, ranking may include receiving a set of runs having a specified run order to generate a target model and receiving a rank configuration. In some embodiments ranking may include receiving a target model from a previous merge and receiving a rank configuration. In some embodiments, ranking may include projecting one or more runs into the target model to generate a bit array of each run. In some embodiments, ranking may include extracting information corresponding to a previously merged run for use as an input run. The system may further include one or more software modules configured to determine at least one redundant test run based upon, at least in part, the ranking The system may also include one or more software modules configured to determine an optimized run order based upon, at least in part, the ranking.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity Like reference numerals in the drawings denote like elements.

System Overview

Figure 1:
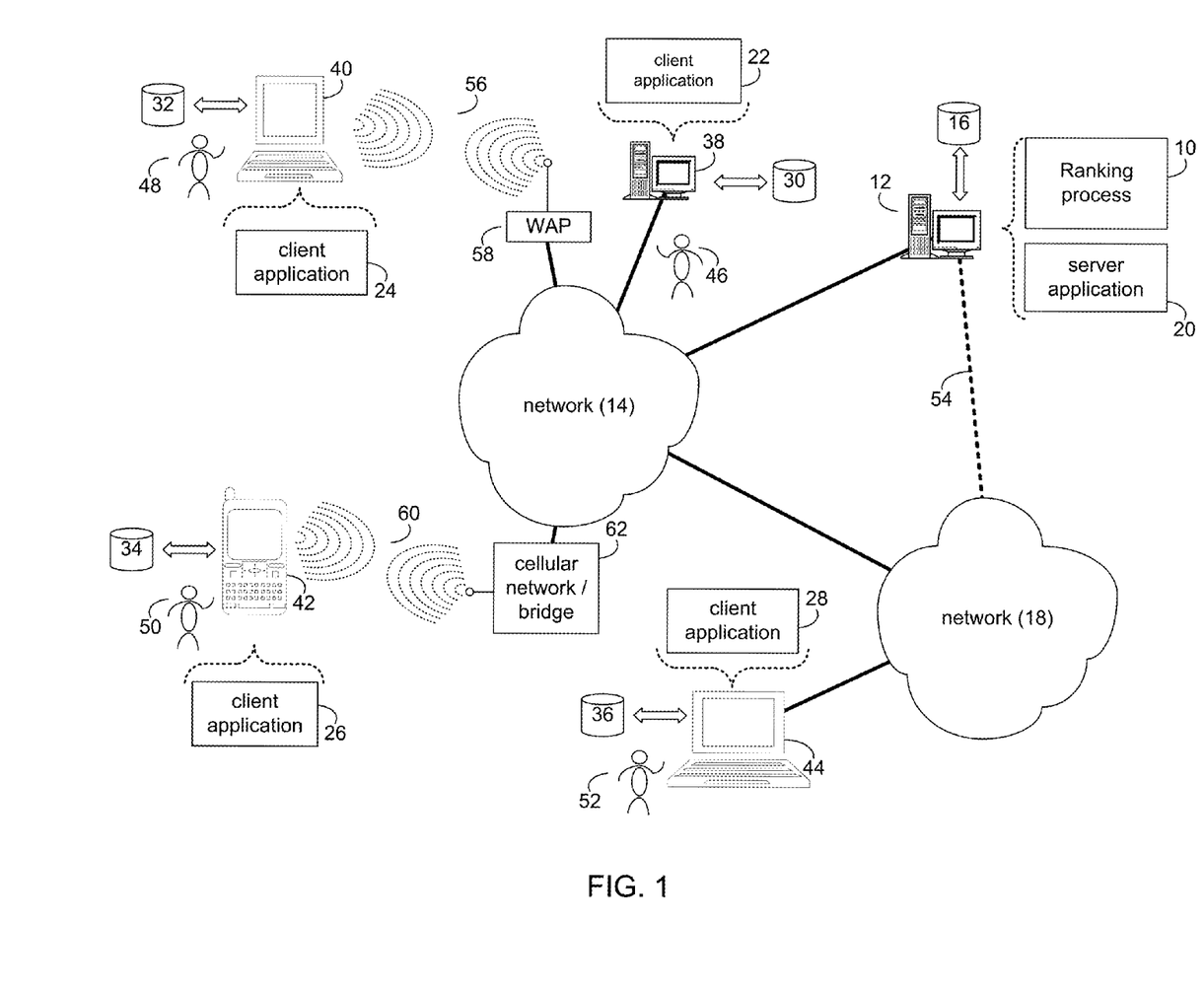
FIG. 1 is an illustration of a ranking process for simulation-based functional verification coupled to a distributed computing network in accordance with an embodiment of the present disclosure.

Referring to FIG. 1, there is shown ranking process 10 that may reside on and may be executed by a computing device (e.g., server computer 12), which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the ranking process may reside on a client electronic device, such as a personal computer, notebook computer, personal digital assistant, or the like.

As will be discussed below in greater detail, ranking process 10 may be associated with simulation-based functional verification of digital designs. In some embodiments, ranking process 10 may be configured to remove redundant tests from a particular test suite.

The instruction sets and subroutines of ranking process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute ranking process 10. Examples of client applications 22, 24, 26, 28 may include, but are not limited to, design verification tools such as those available from the assignee of the present disclosure. These applications may also be executed by server computer 12. In some embodiments, ranking process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the ranking process may be a client-side application (not shown) residing on one or more client electronic devices 38, 40, 42, 44 (e.g., stored on storage devices 30, 32, 34, 36, respectively). As such, the ranking process may be a stand-alone application that interfaces with a client application (e.g., client applications 22, 24, 26, 28), or may be an applet/application that is executed within a client application. As such, the ranking process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Ranking Process

Recent verification technologies include metric-driven verification ("MDV"), assertion-based verification ("ABV") and plan-to-closure methodology. These methodologies are adopted by customers to reduce functional verification time and increase verification productivity. Metric-driven verification is one methodology that may assist in reducing the overall design cycle. Recently several methodologies like open verification methodology ("OVM"), verification methodology manual ("VMM") and universal verification methodology ("UVM") have been adopted by verification communities which provide a framework to achieve metric-driven verification.

Figure 2:
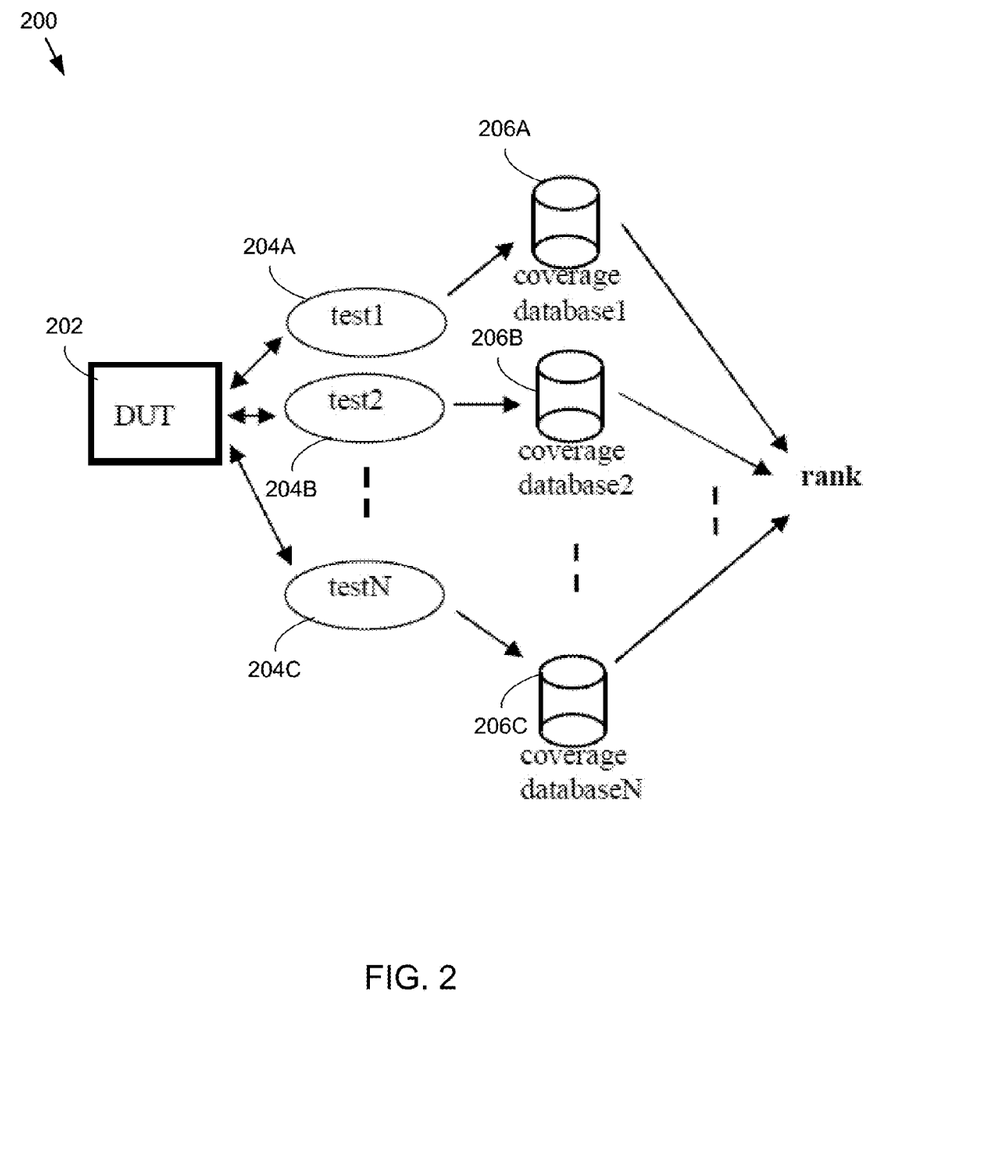
FIG. 2 is an illustration of a coverage ranking flow in accordance with an embodiment of the present disclosure.
Figure 3:
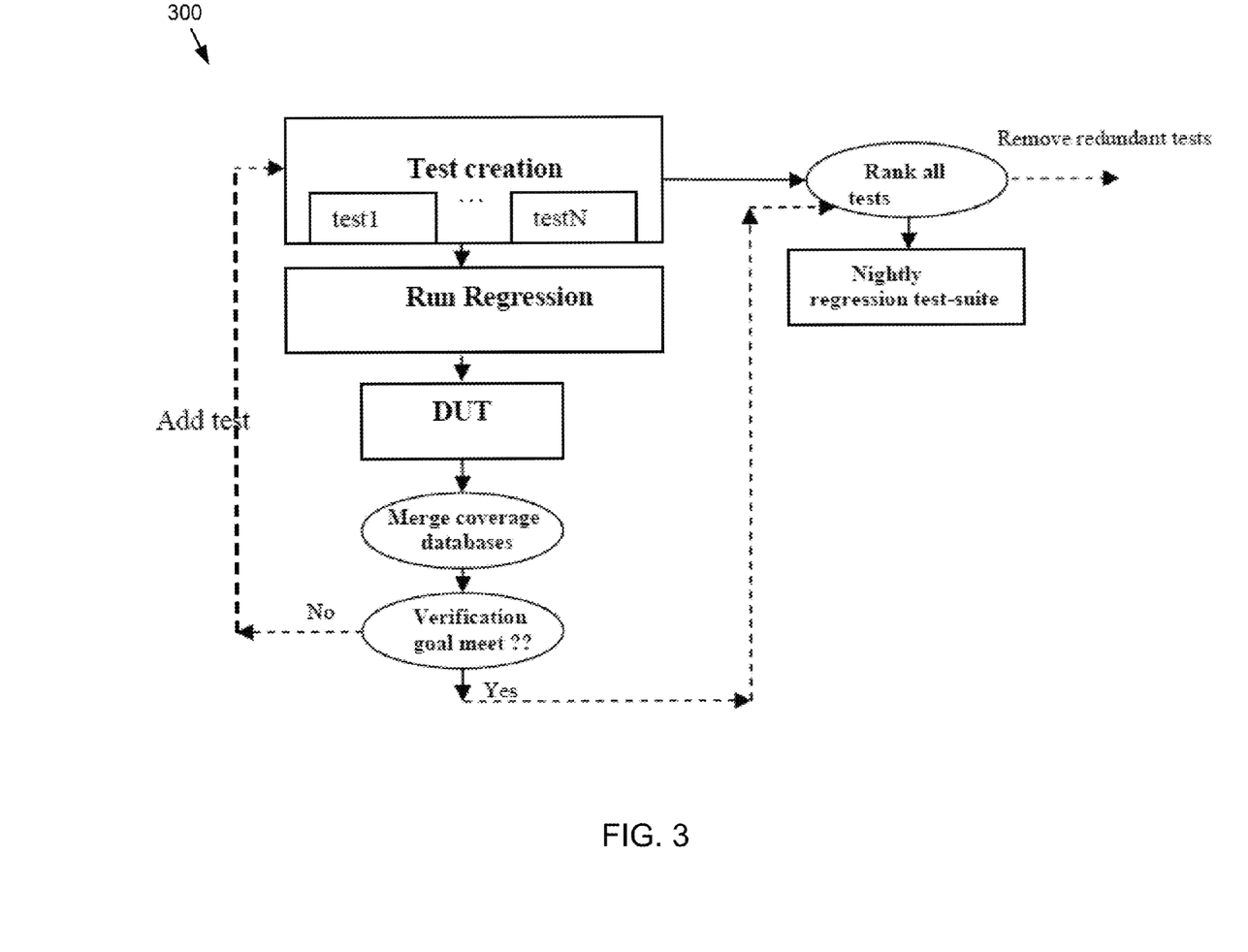
FIG. 3 is an illustration of a coverage ranking flow in accordance with an embodiment of the present disclosure.

Referring now to FIGS. 2-3, embodiments 200 and 300 illustrate a coverage flow having test ranking capabilities. As shown in FIG. 2, a design under verification (DUV) 202 may be simulated using multiple testbenches, e.g., 204a, 204b, 204c. In some embodiments, one or more coverage databases, e.g., 206a, 206b, 206c may be generated for DUV 202 for each simulation run. Once all the simulations have been run, coverage databases obtained from each run may be merged together to get a comprehensive view of the coverage obtained from the entire verification and subsequently ranked to determine an optimized set of runs as shown.

The embodiment shown in FIG. 2 is generally used to rank the coverage data generated from the same DUT with an identical configuration. In other words, this assumes the coverage model should be identical across all runs. However, in actuality, the coverage model across runs could be different for a variety of reasons, including but not limited to, bug fixes in the DUT, different metrics scoring, different options/configuration setting, and/or different select/deselect of instances/modules, assertions and covergroups, etc. Assuming an identical model across different runs may result in a significant limitation. As verification methodologies continue to evolve, the coverage ranking flows depicted in FIGS. 2-3 may require further advancements in the ranking feature to support those complex verification scenarios.

Figure 4:
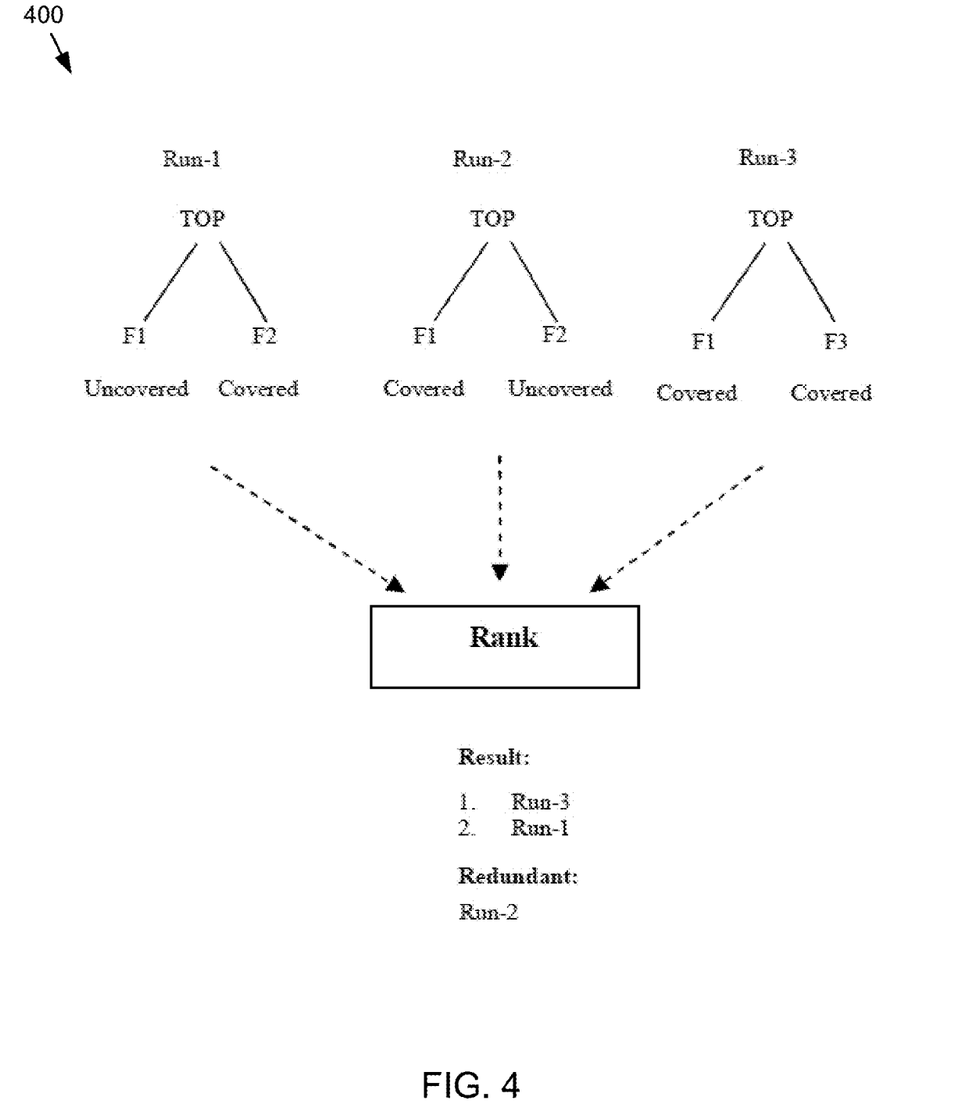
FIG. 4 is an illustration of the ranking process in accordance with an embodiment of the present disclosure.

Referring now to FIG. 4, a diagram 400 depicting an embodiment of ranking process 10 is provided. In some embodiments, ranking process 10 may provide the ability to configure the verification environment. In this way, ranking process 10 may be configured to rank one or more tests based upon a first verification run having a first configuration and a second verification run having a second configuration. For example, in some embodiments, the verification environment may consist of different verification components (VC) which may be configured across different runs. Different configurations of verification components may lead to different functional coverage (e.g., assertion or covergroup) across runs. In some embodiments, various types of metrics scoring may also be configured across various runs. In this way, FIG. 4 describes a scenario where functional coverage points across runs vary. As shown in FIG. 4, in Run-1 and Run-2, there are two functional coverage points, namely, F1 and F2. In Run-1, F1 is uncovered and F2 is covered. In Run-2, F1 is covered and F2 is uncovered. In Run-3, Top is configured because of which F2 is deselected/removed and new functional coverage point F3 is added. In Run-3, both F1 and F3 are covered. Ranking process 10 may be configured to handle the scenario of configuration changes across runs and, in this particular example, provides Run-3 and Run-1 as the useful tests and Run-2 as the redundant test.

Figure 5:
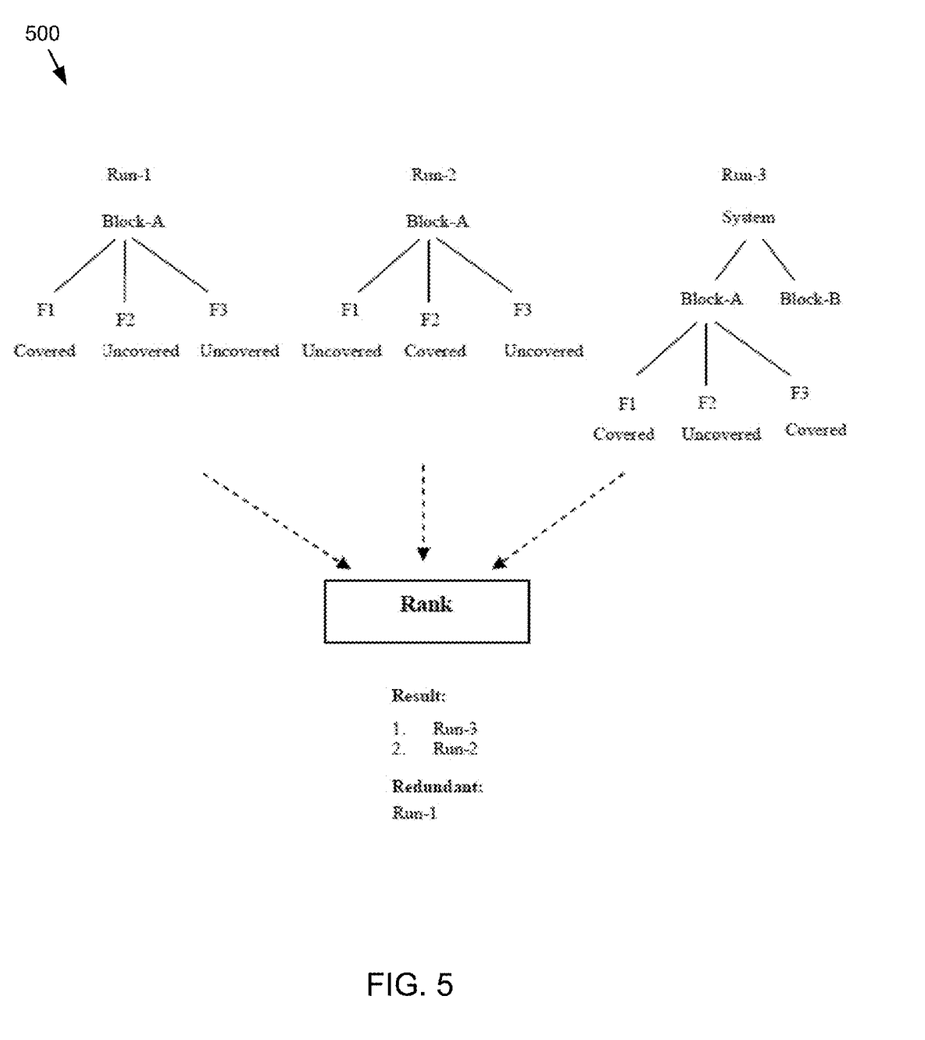
FIG. 5 is an illustration of the ranking process in accordance with an embodiment of the present disclosure.

Referring now to FIG. 5, a diagram 500 depicting an embodiment of ranking process 10 is provided. In some embodiments, ranking process 10 may be configured to perform the ranking of system-level and block-level tests concurrently. The term "concurrently" as used herein may refer to a situation in which at least a portion of a system-level test and a block-level test are both being analyzed and/or ranked at the same point in time. In an effort to speed up design and verification, a system-on-a-chip ("SOC") may be divided into smaller components like block and chip. Different teams, possibly across different geographies, involved with design and verification of various blocks and chips of the SOC in a concurrent manner, which makes the verification task quite complex and time consuming. In order to speed-up the functional verification, advance verification methodologies like OVM/UVM and VMM may provide reusability of the same verification environment at different levels like block, chip and system-level. In the first stage, each block may be tested thoroughly. After block-level verification, the entire system may be integrated and system-level testing may be performed as is shown in FIG. 5. In this particular embodiment, the system has 2 blocks depicted in FIG. 5 as Block-A and Block-B. While doing the block-level verification of each block, a test environment of the block may be created and each block may be tested independently. Run-1 and Run-2 may correspond to block-level runs of Block-A. In this particular embodiment, there are three functional coverage points, namely F1, F2 and F3 in Block-A. In Run-1, F1 is covered and F2 is uncovered, whereas Run-2 has covered F2 and F1 is uncovered. Functional coverage point F3 is checking the interaction between Block-A and Block-B, hence it is not covered in both Run-1 and Run-2. After verifying Block-A and Block-B independently, system integration may be performed. The system-level environment may be created after reusing the test environment of each block. In system-level testing, the interaction between different blocks is tested. Run-3 may correspond to the system-level test to cover functional coverage point F3, which may also cover F1. In this particular embodiment, the requirement is to rank both block and system-level runs together to get the minimum number of runs to cover the entire coverage space. In this way, ranking process 10 may be configured to rank system and block-level tests together to determine the overlapping test scenarios, which may be removed.

Figure 6:
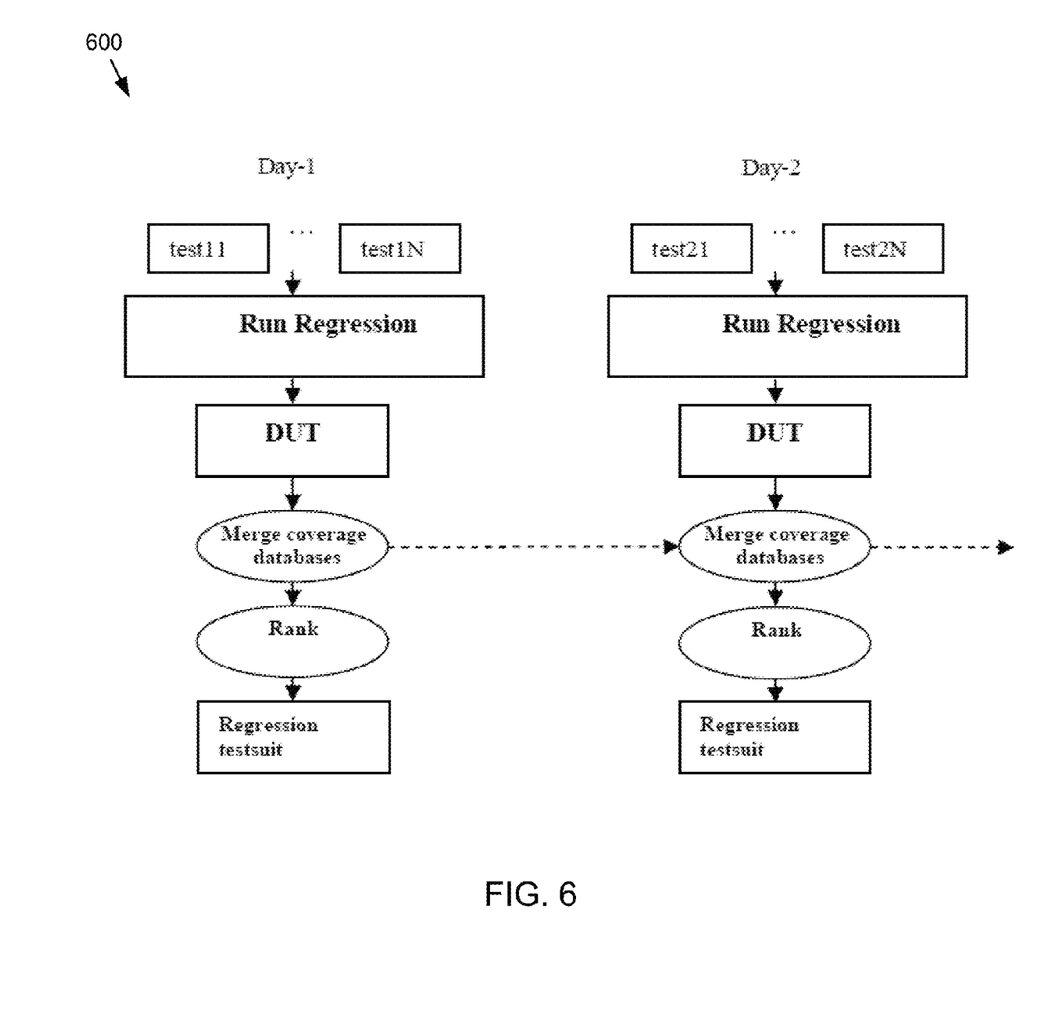
FIG. 6 is an illustration of the ranking process in accordance with an embodiment of the present disclosure.

Referring now to FIG. 6, a diagram 600 depicting an embodiment of ranking process 10 is provided. In some embodiments, ranking process 10 may be configured to rank based upon a combination of a first merged model generated at a first time with a second merged model generated at a second time. Referring again to FIG. 3, diagram 300 depicts a coverage flow where the ranking of tests may be performed after the verification goal is met. In some cases, ranking may be a onetime operation to generate the final sign-off regression test-suite. However, in many instances, tests are added incrementally and the regression may be performed on a regular basis (e.g. daily). In this way, ranking process 10 may be configured to identify the optimized tests that contribute the most to the overall coverage goals. By ranking the tests based on their relative contribution, the verification team may select the smallest number of high-impact tests that yield the greatest increase in coverage. This may be useful during each stage of the project when the regression tests need to be run on daily basis and should be completed as quickly as possible to avoid schedule slips. Thus, ranking process 10 may determine an optimized number of tests (e.g., smallest number of tests) on daily basis which may be used as the nightly regression test-suite. FIG. 6 shows a scenario where in day-1, test11 to test1N are created. The coverage data of test11 to test1N may be merged together to create the merged database and may be followed by ranking process 10 in order to determine the regression test-suite on day-1. Similarly, on day-2, test21 to test2N may be created. The coverage data of test21 to test2N and merged data of day-1 may be merged together to test the verification completeness. Ranking process 10 may then be used to determine the regression test-suite of day-2. This process may be repeated until the verification goal is achieved.

In some embodiments, ranking process 10 may be performed after a merge operation. Additional information regarding target model generation and the merge operation may be found in METHOD AND APPARATUS FOR MERGING COVERAGE FOR MULTIPLE VERIFICATION AND DESIGN SCENARIOS, filed on Jun. 7, 2007, now U.S. Pat. No. 7,890,902 and CONFIGURATION-BASED MERGING OF COVERAGE DATA RESULTS FOR FUNCTIONAL VERIFICATION OF INTEGRATED CIRCUITS, filed on Sep. 6, 2011 having application Ser. No. 13/226,481 which are each incorporated by reference in their entirety. The output of the merge operation may serve as the input to the rank operation. The merge and rank operations may be performed in a cascading manner, for example, the merged data of a previous day may be merged with the tests created on that particular day and then the ranking may be performed. In this way, ranking process 10 may reuse the merged model residing in the memory while performing the rank. This may save time as the creation of a target model from the input run may not be required in ranking process 10. In some embodiments, ranking process 10 may be configured to extract the run information from the merged database, which may serve as an input to ranking process 10. For example, the rank operation in day-1 may reuse the merged model residing in the model and may extract the run information (e.g., test11 . . . test1N) from the merged data which may be used as an input to the rank operation in day-1. The rank operation in day-2 may reuse the merged model residing in the model, which may contain the merged model of day-1 and the merged model of day-2 runs, and may extract the run information (e.g., test11 . . . test1N and test21 . . . test2N) from the merged data which may be used as an input to the rank operation in day-2.

Figure 7:
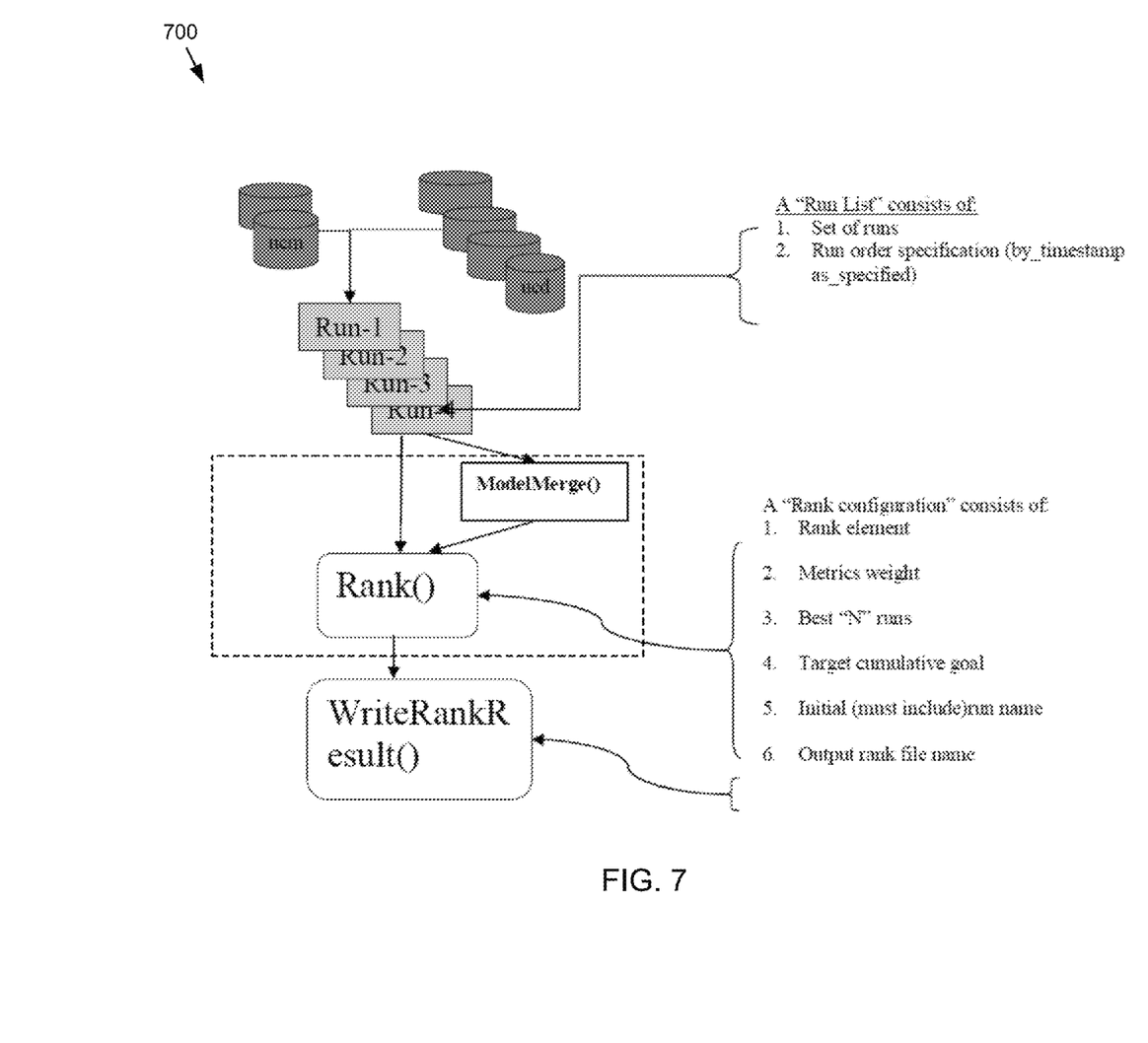
FIG. 7 is an illustration of the ranking process in accordance with an embodiment of the present disclosure.

Referring now to FIG. 7, a diagram 700 depicting an embodiment of ranking process 10 is provided. In some embodiments, ranking process 10 may include receiving a set of runs having a specified run order to generate a target model and receiving a rank configuration when operating in a "standalone" mode. For example, and as shown in FIG. 7, ranking process 10 may receive a run list having a set of runs and/or a run order specification. In some embodiments, the set of runs may be specified either through run path specifications in the command line or through run file option -runfile. The Run file could be a text file containing the test specifications. In some embodiments, the Run path and run file may contain a wildcard specification. One example of a run file format is cov_work/DUT/Run-1 cov_work/DUT/Run-2. In some embodiments, the Run order may be specified through the -run_order option in the rank command. Run order may be based on either timestamp or as specified as the inputs to the rank command. If the run order is specified as by_timestamp then coverage databases may be processed with reverse chronological order, for example, processing the latest database first. If the run order is specified as as_specified then the coverage databases may be processed in the same order as they are specified in the command line. As shown in FIG. 7, the models of the various runs may be merged together using the modelmerge algorithm.

In some embodiments, the rank configuration command may include a variety of selectable options. Some of these options may include, but are not limited to, rank element, rank result, metric weight, best "N" runs, metric cost, initial include runs, target cumulative goal, output rank file name, etc. For example, in the rank element option, a user may select rank elements for which coverage grading is calculated during ranking process 10. The rank element may be either type (/module) or instances/instances hierarchy or covergroup elements (covergroup/coverpoint) or assertions. In some embodiments, modules may be specified through -type option, instances or instances hierarchies can be specified through -inst. The fact that ranking needs to be performed on covergroup elements may be specified through -covergroup/-coverpoint options. Similarly, ranking on assertion may be specified through -assertion option. In some embodiments, if a coverage element is missing then the ranking process may be performed for the entire model. In the rank result option a ranked result may be saved in a file specified through option -out (e.g. an ASCII file). In some embodiments, the file specification may contain the path (/) separator. If the path separator is not there then the result file may be saved in the current working directory. In case of a missing output option, the rank result may not be saved to the disk. In the metric weight option, a weight may be specified to each coverage types. For example, -w_block, -w_expression, -w_toggle, -w_fsm, -w_assertion, -w_covergroup may correspond to the weight for block, expression, toggle, finite state machine ("fsm"), assertion and covergroup respectively. If a weight is not specified then the default weight may be assumed as "1". Alternatively, if a user wants to exclude any coverage types then its weight can be specified as "0". In the metric cost option the ranking cost may be either the CPU time (-cpu) or simulation time (-sim). In some embodiments, the CPU time may refer to the sum of the user CPU time and system CPU time (tms_utime+tms_utime). If the coverage time option is specified then the time may be included in the calculation of total coverage weight. In some embodiments, in a default setting, the cost parameter may not be included in the coverage weight calculation while ranking. In some embodiments, the user may select the option -max to identify the "N" best runs. In this way, ranking process 10 may conclude after computing the best N runs. The best "N" runs may not include the count of redundant runs. In some embodiments, ranking process 10 may list only those redundant runs which are computed prior to stopping. Another rank configuration option includes the best runs to achieve target coverage goals. Here, the user may specify the option -target to stop the ranking after achieving the target cumulative coverage goal. Again, ranking process 10 may list only those redundant runs which are computed prior to stopping. Yet another rank configuration option is the option for initial include runs. Here, the user may specify the option -initial_runfile to specify the run file which contains the run specification that must be included before performing the ranking operation. In some embodiments, the initial include runs may be reported at the beginning of the ranking result in the same order as it is specified in the run file specification. As shown in FIG. 7, once the ranking process has completed the results may be stored in memory using the WriteRankResult function/algorithm.

In some embodiments, and in the event that the metric weight option is not specified, then a default ranking process 10 may be performed for all coverage types available in the databases assuming the weight of each coverage type as 1. One possible use model of ranking process 10 configured in a standalone mode is provided below.

Example of use model of ranking process in a standalone mode:

```
rank_config [metric_type_weight_option]
   [metric_cost_option]
   [best_n_runs_option]
   [target_cumulative_goal_option]
   [initial_run_file_specific ation]
metric_type_weight_option::=[-w_block       [<weight>]]
[-w_expression   [<weight>]]   [-w_toggle    [<weight>]]
[-w_fsm [<weight>]] [-w_assertion [<weight>]] [w_covergroup [<c_weight>]] (Default: <weight>=1)
metric_cost_option::=[-cpu | -sim]
best_n_runs_option::=-max <integer_value>
target_cumulative_goal_option::=-target <cumulative_coverage_goal>
initial_run_file_specification::=-initial_runfile
NOTE:   <module_name>,   <instance_name>,   <cover_group_element_full_path_name>,   <assertion_full_path_name> can contain wildcard.
rank run_specification
   [run_order_specification]
   [result_file_path_specific ation]
   [rank_element_option]
Where:
   run_specification::={<runs> | -runfile <runfile>}
   run_order_specification::=[-run_order   {as_specified   |
by_timestamp}]
   Default: as_specified
   result_file_path_specification::=-out    <resultant_rank_file_path_name>
   rank_element_option::=-type <module_name> |
   -inst <instance_name_specification> |
   -covergroup <cover_group_element_full_path_name>
   -coverpoint <cover_point_element_full_path_name>
   -assertion <assertion_full_path_name>
instance_name_specification::=<instance_name> |
   <instance_hierarchy_specification>
instance_hierarchy_specification::=<instance_name> . . . .
```

In some embodiments, the standalone mode of ranking process 10 may include a number of stages, which may include, but are not limited to, target model generation, projecting each run in to the target model, and ranking each run. In the target model generation stage, the model/ucm of each run may be loaded and model union may be performed to create the target model. In the projection stage, each run data/ucd may be projected in to the target model and a bit array of each run may be created. In this stage, each run data/ucd may be projected in to the target model. Then a bit array may be created that may represent the run in subsequent stages. In some embodiments, after creating the bit array, the data/ucd of each run may be deleted from the memory. The bit array may be the compact representation of the coverage data. For example, if a coverage run contains one million coverage objects then only one million bits (~124Kbytes) may be required to represent the run data. Similarly, if there are 10,000 runs then the total memory footprint to perform the ranking process for all runs may be approximately 1.2 GB. In some embodiments, ranking each run may involve applying a cover algorithm on the bit arrays to determine the best optimized run order. Ranking process 10 may also be configured to determine any redundant runs.

One possible example of ranking process 10 operating in standalone mode is provided below.

```
// runList=set of runs to be merged
// rankConfigList=set of rank configurations
// output=rank output to be stored in the file
RankInStandaloneMode(runList, rankConfigList, output)
{
// Prepare target model
Target_model=Create_target_model_in_standalone_mode
(runList, run_order_mode)
// Project data of each run and create bit array
Bit_array_of_runs=Create_bit_arrays(Target_model, run-
List, rankConfigList)
// Do ranking of all runs
Result_array_id=Do_rank(Bit_array_of_runs, run_size)
// save the result in output
Save_result(Result_array_id, output)
}
// It creates the target model of rank in standalone mode
Create_target_model_in_standalone_mode(runList, run_or-
der_mode)
{
  If(run_order_mode=by_timestamp) {
  // Sort the runList on the basis of the timestamp of model
  SORT(runList, TIMESTAMP)
  }
  // Union all Models
  Target_model=MODEL(runList[0])
  For each remaining run "ts" of runList {
    Sec_model=MODEL(ts)
    UNION(Target_model, Sec_model)
  }
  Return Target_model
}
// Project data of each run and create bit array
Create_bit_arrays(Target_model, runList, rankConfigList)
{
  For each run "ts" of runList {
  DATA_PROJECT(ts,Target_model)
  Bit_array_of_run[i]=Create_bit_array_of_run(ts, Target_
    model, rankConfigList)
}
Return Bit_array_of_run
}
Create_bit_array_of_run(ts, Target_model, rankConfigList)
{
  // create a bit array with size equal to the number of cov-
    erage items in target model
  // if an item is covered then it will be set to "1"
  // If any metrics is disabled then value of those bit will be 0
}
// Do ranking of all runs
Do_rank(Bit_array_of_runs, run_size)
{
  Int I=0;
  Id=Get_the_run_id_with_max_one(Bit_array_of_runs,
    run_size)
    Add_run_id_to_result_list(Id)
    Union_so_far_array=COPY(Bit_array_of_runs[Id]);
    Remove_run_from_run_list(Id, Bit_array_of_runs)
    For each bit_array of Bit_array_of_runs {
    Id=Get_run_id_with_max_increment_coverage(Bit_ar-
      ray_of_runs, run_size,
  Union_so_far_array)
    Add_run_id_to_result_list(result_array, Id)
    Union_so_far_array=Union_so_far_array | Bit_array_of_
  runs[Id]
}
  Return result_array
}
// return the array Id with maximum number of one bit
Get_the_run_id_with_max_one(Bit_array_of_runs, run_
size)
{
  Int Id=0
  Int count_one=0
  Int max_number_of_bit=0
  For each bit array of Bit_array_of_runs {
  count_one=COUNT_ONE(Bit_array_of_runs[i])
  If(count_one > max_number_of_bit){
  max_number_of_bit=count_one
  Id=i
  }
Return Id
}
// return the array id which gives maximum coverage incre-
ment w.r.t Union_so_far_array
Get_run_id_with_max_increment_coverage(Bit_array_of_
runs, run_size, Union_so_far_array)
{
  Int Id=0
  Int count_one=0
  Int max_number_of_bit=0
  Tmp_union_so_far_array=COPY(Union_so_far_array)
  For each bit array of Bit_array_of_runs {
  Tmp_union_so_far_array=COPY(Union_so_far_array)
  Tmp_union_so_far_array=Tmp_union_so_far_array |
  Bit_array_of_runs[i])
  count_one=COUNT_ONE(Tmp_union_so_far_array)
  If(count_one > max_number_of_bit){
  max_number_of_bit=count_one
  Id=i
  }
Return Id
}
```

Figure 8:
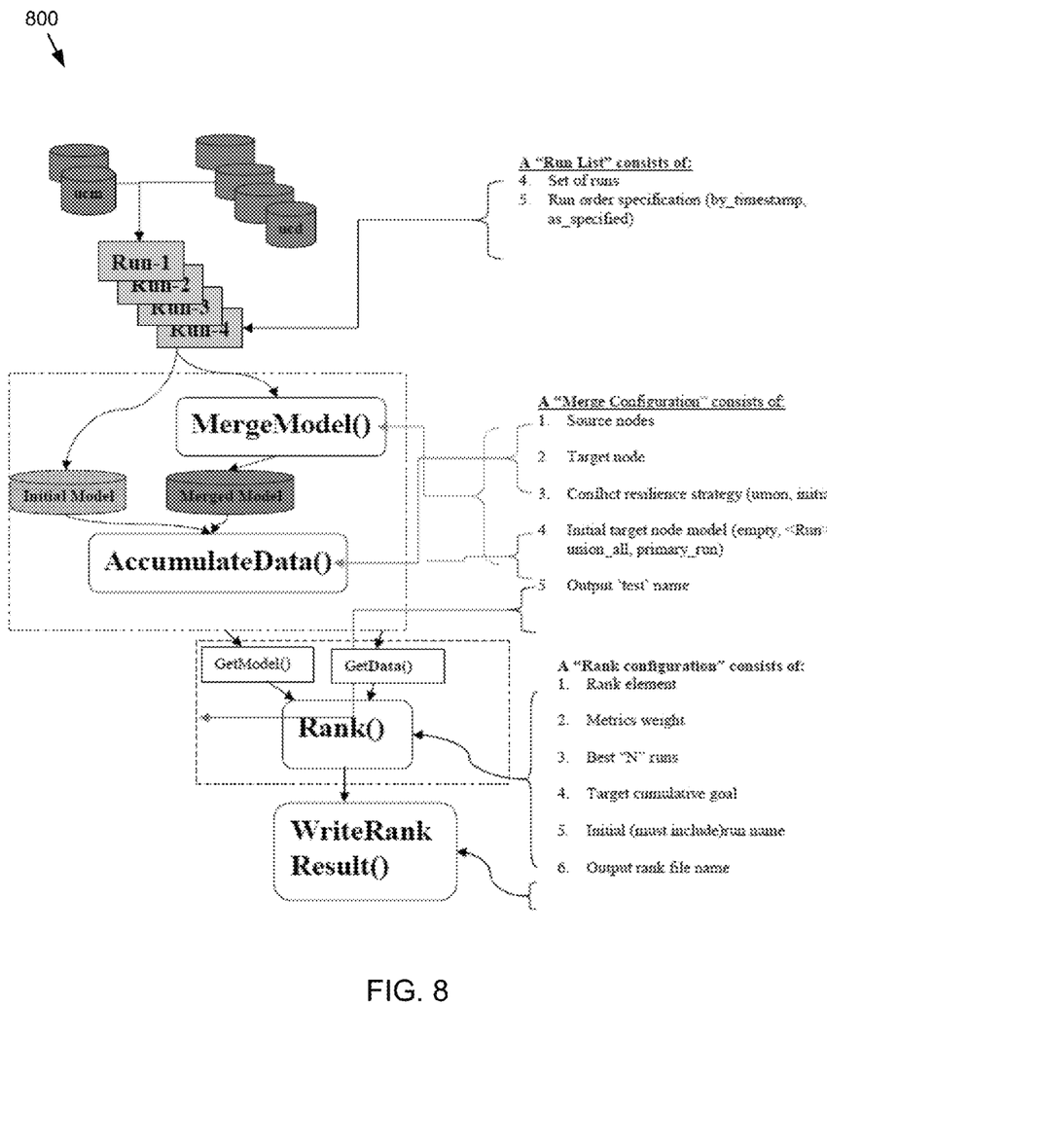
FIG. 8 is an illustration of the ranking process in accordance with an embodiment of the present disclosure.

Referring now to FIG. 8, a diagram 800 depicting an embodiment of ranking process 10 is provided. In some embodiments, ranking process 10 may include receiving a target model from a previous merge and/or receiving a rank configuration. In some embodiments, the user may be provided with the option of using the previous merge (e.g., -use_prev_merge) in the rank command. It should be noted that specifying this option with run specification and/or run order specification may result in an error condition. As shown in FIG. 8, this embodiment may utilize the rank configuration command as was discussed with reference to FIG. 7. In this particular embodiment, the target model may have been generated in a previous merge, which may be stored in memory, and may be reused during ranking process 10. In some embodiments, the target model of a previous merge may be removed after executing the next merge command so that at any point in time there may be one target model available to be reused by the subsequent rank command.

An example of a use model of ranking process 10 configured with a previous merge is provided below:
rank -use_prev_merge [result_file_path_specification]
    [rank_element_option]
result_file_path_specification and rank_element_option is already explained in previous section.

The following depicts an example of a use model showing the rank command in both modes:
rank {run_specification [run_order_specification] | -use_prev_merge}
    [result_file_path_specification]
    [rank_element_option]
In this particular example, the underlined sections may correspond to the stand-alone model, the italicized sections may correspond to the link with previous merge mode. In some embodiments, the link with previous merge mode of ranking process 10 may include a number of stages, which may include, but are not limited to, target model generation, projecting each run in to the target model, and ranking each run. In this particular mode, when receiving a model from a previous merge operation, the target model may already be generated by the previous merge command and may reside in the memory. This mode may also include projecting each run data/ucd in to the target model to create a bit array of each run. In this stage, each input run data/ucd may be projected in to the target model. Here, if an input run is previously merged then the run information used to create the merged run may be extracted from the history information of the merged run. In some embodiments, the extracted original runs may participate as the input runs. Then, a bit array may be created which may represent the input run in subsequent stage. After creating the bit array, the data/ucd of each run may be deleted from the memory. This mode may also include ranking each run. For example, a set cover algorithm may be applied on the bit arrays to determine the most optimized run order. In some embodiments the redundant runs may be determined as well.

One possible example depicting aspects of ranking process 10 in accordance with the link with previous merge mode is provided below.
// runList=set of runs to be merged
// rankConfigList=set of rank configurations
// output=rank output to be stored in the file
RankInTieUpWithMergeMode(runList, rankConfigList, output)
{
// Get the target model from memory which is created by previous merge operation
Target_model=Get_target_model_from_memory( )
// create the new input runs, check if any input runs are previously merged run.
// If yes, extract the original runs from the history information of the database.
Resultant_input_runs=Resolve_input_runs(runList)
// Project data of each run and create bit array
Bit_array_of_runs=Create_bit_arrays(Target_model, Resultant_input_runs, rankConfigList)
// Do ranking of all runs
Result_array_id=Do_rank(Bit_array_of_runs, run_size)
// save the result in output
Save_result(Result_array_id, output)
}
Resolve_input_runs(runList)
{
For each run "ts" of runList {
    // For merged run, there is flag in db
    If(MERGED_RUN(ts)) {
    // Get the original runs list from the history of db
    Original_run_list=GET_ORIGINAL_RUN_LIST(ts)
    ADD(Total_run_list, Original_run_list)
    Else
    ADD(Total_run_list, ts)
}
Return Total_run_list
}

Figure 9:
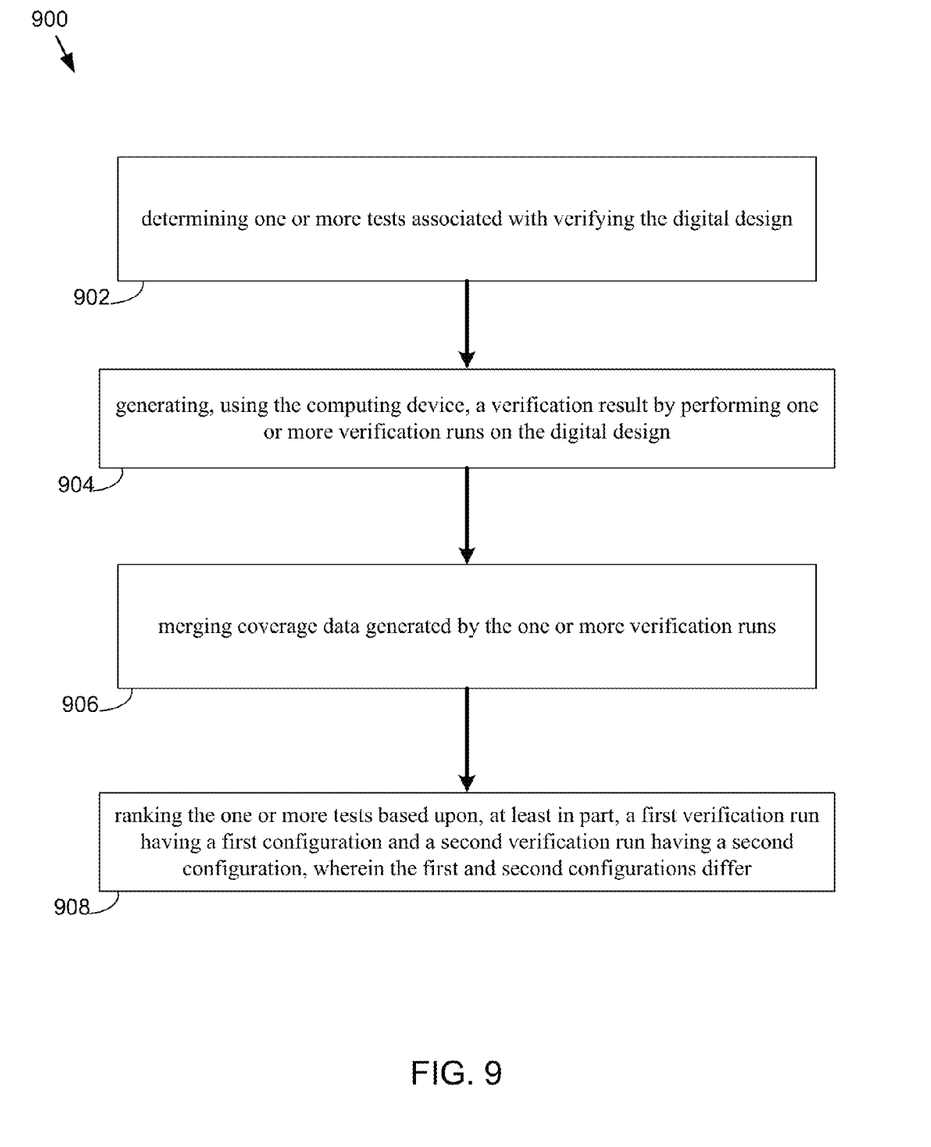
FIG. 9 is an exemplary flowchart of the ranking process in accordance with an embodiment of the present disclosure.

Referring now to FIG. 9, a flowchart 900 depicting an embodiment of ranking process 10 is provided. In some embodiments, ranking process 10 may include determining (902) one or more tests associated with verifying the digital design and generating (904), using the computing device, a verification result by performing one or more verification runs on the digital design. The method may further include merging (906) coverage data generated by the one or more verification runs and ranking (908) the one or more tests based upon, at least in part, a first verification run having a first configuration and a second verification run having a second configuration, wherein the first and second configurations differ.

The teachings of the present disclosure provide a number of advantages over existing technologies. For example, ranking process 10 may be configured to perform the rank for varying configurations of DUT across runs. As discussed above, the configuration of the DUT could be different across different runs. Ranking process 10 may be configured to rank the tests having such changes. As discussed above, FIG. 4 depicts one possible scenario where functional coverage points across runs vary. The objective is to rank coverage of all runs. This may be achieved by the following command: rank Run-1 Run-2 -out Result. Additionally and/or alternatively, a user may use following command: merge Run-1 Run-2 -initial_model union_all -out merge_result rank -use_prev_merge -out rank_result.rpt.

In some embodiments, ranking process 10 may be configured to perform rank of a DUT, which may be verified in different contexts (e.g. block and/or system-level). Ranking process 10 may be configured to rank those tests together to determine the most optimized ranking order. FIG. 5 depicts one example of a scenario where the same block may be simulated in both the block and system-level context. Ranking process 10 may allow for the testing of both block and system-level simulation runs concurrently to get the optimized rank result. For example, the following rank command could achieve this objective:
    merge_config -source Block-A -target System.Block-A
    merge_config -source Block-B -target System.Block-B
    merge_config -source Block-C -target System.Block-C
    merge Run-4 Run-1 Run-2 Run-3 -initial_model union_all -out Result
    rank -use_prev_merge -out rank_result.rpt In some embodiments, ranking process 10 may also be configured to perform interactive cascading ranking as is shown in FIG. 6. As discussed above, ranking process 10 may provide the ability to perform ranking in a cascading manner. Since ranking process 10 may utilize previous merge information, the model union stage may be shared between the merge and rank operations. This may save time and increase the speed of the ranking process. FIG. 6 depicts one embodiment of a scenario where merging and ranking may be performed in a cascading manner. To achieve the rank of all runs at day-1, the following command could be used:

merge Test11 . . . Test1N -initial_model union_all -out merge_result_day-1 rank -use_prev_merge -out rank_result_day-1.rpt

Similarly, to achieve the rank of all runs at day-1 and 2, the following command could be used:

merge merge_result_day-1 Test21 . . . Test2N -initial_model union_all -out merge_result_day-2 rank -use_prev_merge -out rank_result_day-2.rpt

In some embodiments, the previous day merge result may also be merged (e.g. in day-2 shown in FIG. 6). In this way, and using FIG. 6 as an example, ranking process 10 may also consider the day-1 run while ranking. It should be noted that the day-1 and day-2 illustration is merely provided by way of example and is included to illustrate that two separate time periods may be involved. Although, the example provided depicts two time periods it should be noted that any number of time periods may be used in accordance with the teachings of the present disclosure.

The teachings of the present disclosure may result in a highly scalable solution having minimal capacity issues. Ranking process 10 may provide a solution where each run may be represented with a bit slice. Since the memory consumption per run is low, a large number of sizable databases could be ranked together. In other words, ranking process 10 may be highly scalable with respect to the design size and number of runs and may be configured to generate an optimized result.

It will be apparent to those skilled in the art that various modifications and variations can be made in the constraint minimization scheme for formal verification of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for verifying a digital design using a computing device comprising:

determining one or more tests associated with verifying the digital design;

generating, using the computing device, a verification result by performing one or more verification runs on the digital design;

merging coverage data generated by the one or more verification runs;

ranking the one or more tests based upon, at least in part, a first verification run having a first rank configuration and a second verification run having a second rank configuration, wherein the first and second rank configurations differ, wherein ranking includes performing system-level and block-level tests concurrently and wherein ranking includes ranking the system-level and block-level tests together to determine at least one overlapping test, wherein each rank configuration is user configurable and includes rank element information, metrics cost information, and best "n" run information, wherein metrics cost information is based upon, at least in part, at least one of CPU time and simulation time; and     determining an optimized run order based upon, at least in part, the ranking.

2. The computer-implemented method of claim 1 wherein ranking is based upon, at least in part, a combination of a first merged model generated at a first time with a second merged model generated at a second time.

3. The computer-implemented method of claim 1 wherein ranking includes receiving a set of runs having a specified run order to generate a target model and receiving a rank configuration.

4. The computer-implemented method of claim 1 wherein ranking includes receiving a target model from a previous merge and receiving a rank configuration.

5. The computer-implemented method of claim 3 wherein ranking includes projecting one or more runs into the target model to generate a bit array of each run.

6. The computer-implemented method of claim 4 wherein ranking includes extracting information corresponding to a previously merged run for use as an input run.

7. The computer-implemented method of claim 3 further comprising:

determining at least one redundant test run based upon, at least in part, the ranking.

8. A non-transitory computer-readable storage medium having stored thereon instructions for verifying a digital design using a computing device, which when executed by a processor result in the following operations:

determining one or more tests associated with verifying the digital design;

generating, using the computing device, a verification result by performing one or more verification runs on the digital design;

merging coverage data generated by the one or more verification runs;

ranking the one or more tests based upon, at least in part, a first verification run having a first rank configuration and a second verification run having a second rank configuration, wherein the first and second rank configurations differ, wherein ranking includes performing system-level and block-level tests concurrently and wherein ranking includes ranking the system-level and block-level tests together to determine at least one overlapping test, wherein each rank configuration is user configurable and includes rank element information, metrics cost information, and best "n" run information, wherein metrics cost information is based upon, at least in part, at least one of CPU time and simulation time; and     determining an optimized run order based upon, at least in part, the ranking.

9. The computer-readable storage medium of claim 8 wherein ranking is based upon, at least in part, a combination of a first merged model generated at a first time with a second merged model generated at a second time.

10. The computer-readable storage medium of claim 8 wherein ranking includes receiving a set of runs having a specified run order to generate a target model and receiving a rank configuration.

11. The computer-readable storage medium of claim 8 wherein ranking includes receiving a target model from a previous merge and receiving a rank configuration.

12. The computer-readable storage medium of claim 10 wherein ranking includes projecting one or more runs into the target model to generate a bit array of each run.

13. The computer-readable storage medium of claim 11 wherein ranking includes extracting information corresponding to a previously merged run for use as an input run.

14. The computer-readable storage medium of claim 10 wherein operations further comprise:
   determining at least one redundant test run based upon, at least in part, the ranking.

15. A computing system for verifying a digital design using a computing device comprising:
   at least one processor;
   at least one memory architecture coupled with the at least one processor;
   a first software module executed by the at least one processor, wherein the first software module is configured to determine one or more tests associated with verifying the digital design;
   a second software module executed by the at least one processor, wherein the second software module is configured to generate, using the computing device, a verification result by performing one or more verification runs on the digital design;
   a third software module executed by the at least one processor, wherein the third software module is configured to merge coverage data generated by the one or more verification runs;
   a fourth software module executed by the at least one processor, wherein the fourth software module is configured to rank the one or more tests based upon, at least in part, a first verification run having a first rank configuration and a second verification run having a second rank configuration, wherein the first and second rank configurations differ, wherein ranking includes performing system-level and block-level tests concurrently and wherein ranking includes ranking the system-level and block-level tests together to determine at least one overlapping test, wherein each rank configuration is user configurable and includes rank element information, metrics cost information, and best "n" run information, wherein metrics cost information is based upon, at least in part, at least one of CPU time and simulation time; and
   a fifth software module executed by the at least one processor, wherein the fifth software module is configured to determine an optimized run order based upon, at least in part, the ranking.

16. The computing system of claim 15 wherein ranking is based upon, at least in part, a combination of a first merged model generated at a first time with a second merged model generated at a second time.

17. The computing system of claim 15 wherein ranking includes receiving a set of runs having a specified run order to generate a target model and receiving a rank configuration.

18. The computing system of claim 15 wherein ranking includes receiving a target model from a previous merge and receiving a rank configuration.

19. The computing system of claim 17 wherein ranking includes projecting one or more runs into the target model to generate a bit array of each run.

20. The computing system of claim 18 wherein ranking includes extracting information corresponding to a previously merged run for use as an input run.

21. The computing system of claim 17 further comprising:
   a fifth software module executed by the at least one processor, wherein the fifth software module is configured to determine at least one redundant test run based upon, at least in part, the ranking.

* * * * *